United States Patent [19]
Miller et al.

[11] Patent Number: 5,699,651
[45] Date of Patent: Dec. 23, 1997

[54] SELECTOR ASSEMBLY

[75] Inventors: Derek Miller, Dallas; Thomas Edward Weitkamp, Acworth; Steve Brown, Canton, all of Ga.

[73] Assignee: Riverwood International Corporation, Atlanta, Ga.

[21] Appl. No.: 652,295

[22] Filed: May 23, 1996

[51] Int. Cl.⁶ .................................................. B65B 35/30
[52] U.S. Cl. ........................... 53/448; 53/534; 53/542; 53/543; 198/418.7; 198/419.3; 198/459.8
[58] Field of Search ........................... 53/448, 534, 542, 53/543; 198/418.7, 419.2, 419.3, 459.8, 461.1, 461.2, 461.3

[56] References Cited

U.S. PATENT DOCUMENTS

| | | | |
|---|---|---|---|
| 3,155,221 | 11/1964 | Griner | 198/419.3 |
| 3,194,382 | 7/1965 | Nigrelli et al. | 53/543 X |
| 3,482,674 | 12/1969 | Wiseman | 198/461.3 |
| 3,747,739 | 7/1973 | Fuchs et al. | 198/461.1 X |
| 4,093,063 | 6/1978 | Calvert et al. | 198/419.3 |
| 4,360,098 | 11/1982 | Nordstrom | 198/419.2 X |
| 4,417,117 | 11/1983 | Opprecht | 198/461 X |
| 4,443,995 | 4/1984 | Myers et al. | 53/443 |
| 4,552,261 | 11/1985 | Raudat et al. | 198/419.3 |
| 4,682,684 | 7/1987 | Lothman | 198/461.2 X |
| 4,724,946 | 2/1988 | Cinotti | 198/419.2 |
| 4,925,006 | 5/1990 | Lentz et al. | 198/461.1 |
| 4,934,510 | 6/1990 | Lintgen et al. | 198/461.3 |
| 4,991,708 | 2/1991 | Francioni | 198/419.2 |
| 5,012,916 | 5/1991 | Cruver | 198/419.2 X |
| 5,038,915 | 8/1991 | Delsanto | 198/419.3 |
| 5,097,939 | 3/1992 | Shanklin et al. | 198/419.3 X |
| 5,161,664 | 11/1992 | LeBras | 198/418.7 X |

Primary Examiner—Daniel Moon

[57] ABSTRACT

A selector assembly for dividing a continuous line of products moving along a processing path is positioned between a product infeed line and packaging machine line. As the line of products enters the selector assembly, the products are engaged by a rotating starwheel which meters the further flow of the products into a product grouping area of the selector assembly. Thereafter, the lugs of upper and lower selector belts selectively engage the line of products to divide the line of products into groups of products for packaging. The selector lugs engage the groups of products at the product infeed speed and thereafter are progressively accelerated to accelerate the groups of products up to the speed of the packaging machine line for transfer of the groups of products to the packaging machine line.

22 Claims, 6 Drawing Sheets

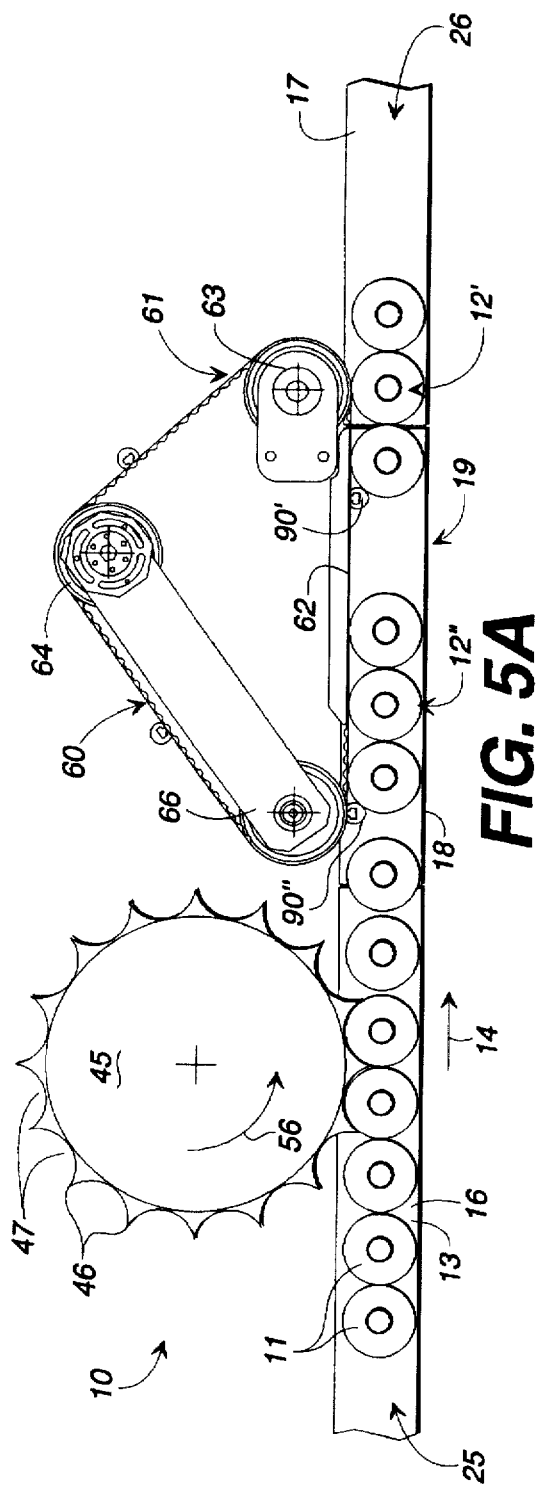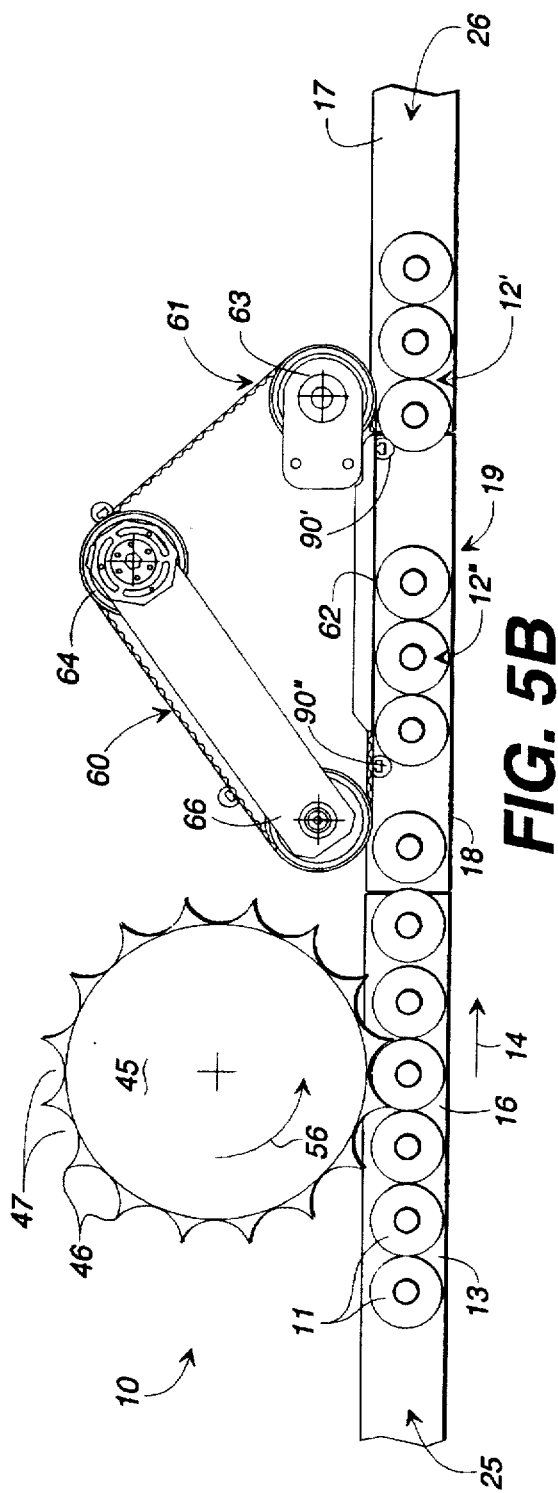

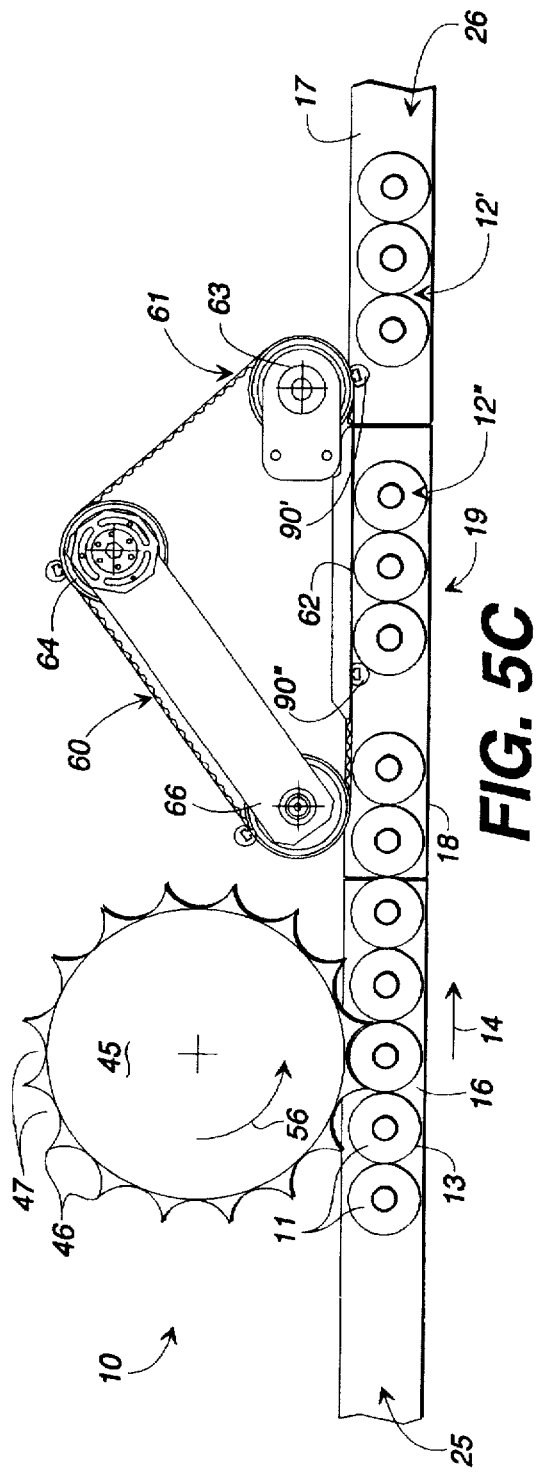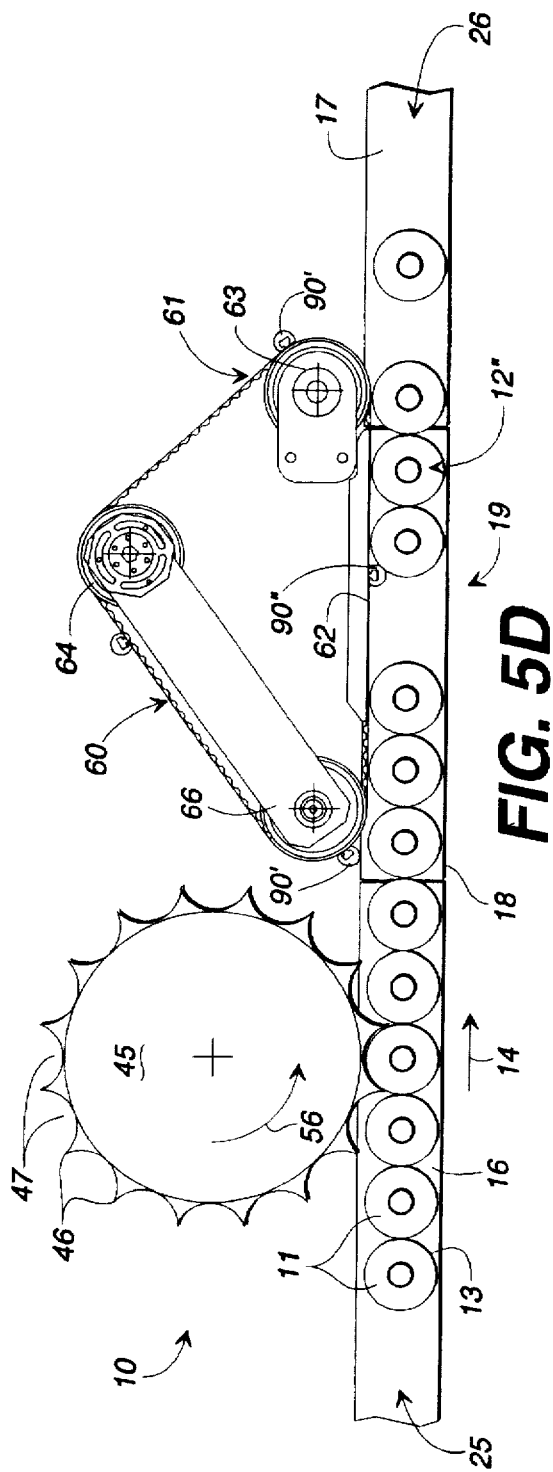

SELECTOR ASSEMBLY

FIELD OF THE INVENTION

The present invention relates in general to a selector assembly for dividing continuous lines of products into groups for packaging. In particular, the present invention relates to a selector assembly in which substantially continuous lines of products such as bottles or cans being moved from a product infeed line to a packaging machine line are selectively divided into groups and are engaged by selector belts which control the progressive acceleration of the groups of products from the speed of the product infeed line up to the speed of the packaging machine for loading of the groups of products into packages in the packaging machine.

BACKGROUND OF THE INVENTION

In the automated production and packaging of products such as cans or bottles of soft drinks or other food products, the products, after being filled, generally are moved along a product infeed line and are fed into a packaging machine. As the products are removed from the infeed line to the packaging machine line, the products are generally separated into groups that are selectively fed into a packaging machine for loading into cartons or other packages. Such grouping and transition of the products generally is carried out by a selector assembly positioned between the product infeed and packaging machine lines. The product infeed and packaging machine lines or conveyors, however, generally are run at different fixed speeds. Thus, the products must be accelerated between the slower infeed line and the faster packaging machine line to transition the products to the packaging machine line speed. The problem in the past has been that typically, when the products have been fed onto packaging machine line by conventional selector systems, the products are substantially instantaneously accelerated to the speed of the packaging machine line. Such instantaneous acceleration tends to slam the products forwardly, causing the first or foremost products in each group of products to fall over, or causes the products of the group to become jammed together creating a machine jam and/or causing breakage.

Attempts have been made in the prior art to solve this problem by attempting to create a much more gradual acceleration of the groups of products onto the packaging machine line. Such prior systems include timing screw systems and lug chain systems. In timing screw systems, large timing screws are mounted along the processing paths of the products between the infeed and packaging machine lines. The products are received in pockets formed between the teeth of the screws, and are urged forwardly as the screws are rotated to accelerate the groups of products to the packaging machine line speed. Such timing screw systems, however, have several disadvantages, the most notable being that as the size of the products increases the products tend to become too big to fit within the pockets between the teeth of the screws. As a result, the screws lose control of the products as they are moved toward the packaging machine line so the products could be toppled or jammed together, and further can be broken due to pressure of the engagement between the teeth of the screws and the products. Additionally, such timing screw systems generally require a relatively large working area and thus take up valuable manufacturing floor space.

The conventional lug chain systems generally include a series of lug chains positioned between the product infeed and packaging machine lines, with each successive a lug chain being run at generally higher velocity. The problem with such systems is that they generally are limited by the amount of space available for the selector system between the infeed and packaging machine lines. Such systems can work well when given sufficient space to include several lug chains to progressively speed up the flow of products over an increased area. However, with floor space in most manufacturing plants being at a premium, it is somewhat impractical to use several successive lug chains between the infeed and packaging machine lines. Thus, most typical lug chain systems include two to three chains that are run at successively greater fixed speeds, with the result being a substantially instantaneously acceleration of the products each time there is a hand-off of the products from one lug chain to another. In addition, as with the timing screw systems, such lug chain systems generally are not readily adjustable to accommodate different sized products such as, for example, going from 2 inch diameter to 4 inch diameter bottles.

Accordingly, it can be seen that a need exists for a selector assembly for dividing a continuous line of products into groups of products and progressively accelerating the groups of products from the speed of the product infeed line to the speed of the packaging machine line to enable smoother transitions between the infeed line of the products and the packaging machine line within a smaller machine space, and which is readily and easily adjustable to accommodate variations in the size of the products passing through the selector assembly for loading into the packaging machine in order to enable the more accurate and efficient selecting and loading of products by the packaging machine.

SUMMARY OF THE INVENTION

Briefly described, the present invention comprises a selector assembly for dividing substantially continuous lines of products such as soft drink bottles into groups and accelerating the groups to a speed substantially equivalent to the speed of the packaging machine line for loading the products into the product packages on the packaging machine. Typically, the products will enter the selector assembly in one to two substantially continuous lines of products moving along a product infeed line. The speed of the infeed line generally is significantly slower than the speed of the packaging machine line, which disparity requires that the products be accelerated between the infeed and packaging machine lines to bring the products up to the speed of the packaging machine speed for a smooth transition thereto.

Typically, if there are two lines of products, selector assemblies are mounted on opposite sides of the processing paths of the products, with each selector assembly engaging one of the lines of products. Each selector assembly includes an adjustable framework which enables the elements of each selector assembly to be adjusted according to the size and configuration of the bottles, cans or other products or articles being divided into selected groups. The selector assemblies each further include an upstream or inlet end and a downstream or discharge end. A starwheel is positioned at the inlet end of each selector assembly. The starwheel includes a series of radially projecting teeth that define curved product receiving recesses or pockets therebetween. The products are received within the recesses between the teeth of the starwheels as the starwheels are rotated in timed relation with the movement of the products along their processing path to separate and control the further movement of the products. These starwheels thus act as a means for metering the flow of the products into the selector assembly.

A pair of selector belts are mounted immediately downstream from each starwheel with a portion of each selector belt extending adjacent and substantially parallel to the processing paths of the bottles. The selector belts each include a series of lugs mounted at spaced intervals about their circumference. The belts each extend about their own, separate drive gear, and about a take-up assembly and idler gear. The take-up assembly includes a take-up arm having a first end pivotally mounted to the idler gears for the selector belts, and a second end mounted to take-up gears for the belts. The take-up arm is moved toward and away from the processing path of the bottles and in a substantially arcuate movement so as to move the take-up gears toward and away from processing path of the products to take-up slack or relieve excess tension from the selector belts so as to maintain a substantially constant tension therein.

After a predetermined number of products have been metered from the infeed line by the starwheels, a lug of either the upper or lower selector belt is moved into engagement with the products, thus forming a group of two or more products. The lugs of the upper and lower selector belts are arranged out of phase with one another so that each selector belt engages and picks up alternate product groups. Each of the selector belts further is independently driven by a separate servomotor which controls and varies the velocity of its particular selector belt. As the lugs of each selector belt engage a selected group of products, such engagement is carried out at the infeed speed of the products. Thereafter, the belt and thus the group of products being engaged and moved thereby, are progressively accelerated by their servomotors up to the speed of the packaging machine line. The groups of bottles thus are delivered under control to the packaging machine at approximately the same rate of speed as the speed of the containers moving along the packaging machine line. Once the groups of products have been deposited on the packing machine line, the servomotors slow their selector belts back down to the infeed speed of the products so the products are not slammed or jerked by the lugs of the selector belts engaging the products at a faster speed than the rate of the infeed rate of the products.

Accordingly, it is an object of present invention to provide an improved method and apparatus for selecting and dividing lines of products into product groups for packaging.

Another object of this invention is to provide an improved selector assembly for dividing a line of products into groups of products for packaging, in which the groups of products are progressively accelerated under control from the infeed line speed to packaging machine line speed to prevent toppling, jamming and/or breakage of the products.

Another object of this invention is to provide an apparatus for selecting and arranging products into product groups for feeding into a packaging machine, which enables the smooth transition of the groups of products from a product infeed line to the packaging machine line in a reduced area so as to conserve space.

Still another object of this invention is to provide a selector assembly for dividing lines of products into product groups of predetermined numbers for packaging, which is adjustable to accommodate variations in sizes of the products.

Various other objects, features and advantages of the present invention will become apparent to those skilled in the art upon reading the following detailed description when viewed in conjunction with accompanying drawings.

BRIEF DESCRIPTION OF THE DRAWINGS

FIGS. 5–5D are top plan views schematically illustrating the process by which a continuous line of products is divided into product groups by the selector belts and are moved from the infeed line to the packaging machine line.

DETAILED DESCRIPTION OF A PREFERRED EMBODIMENT

Figure 1:
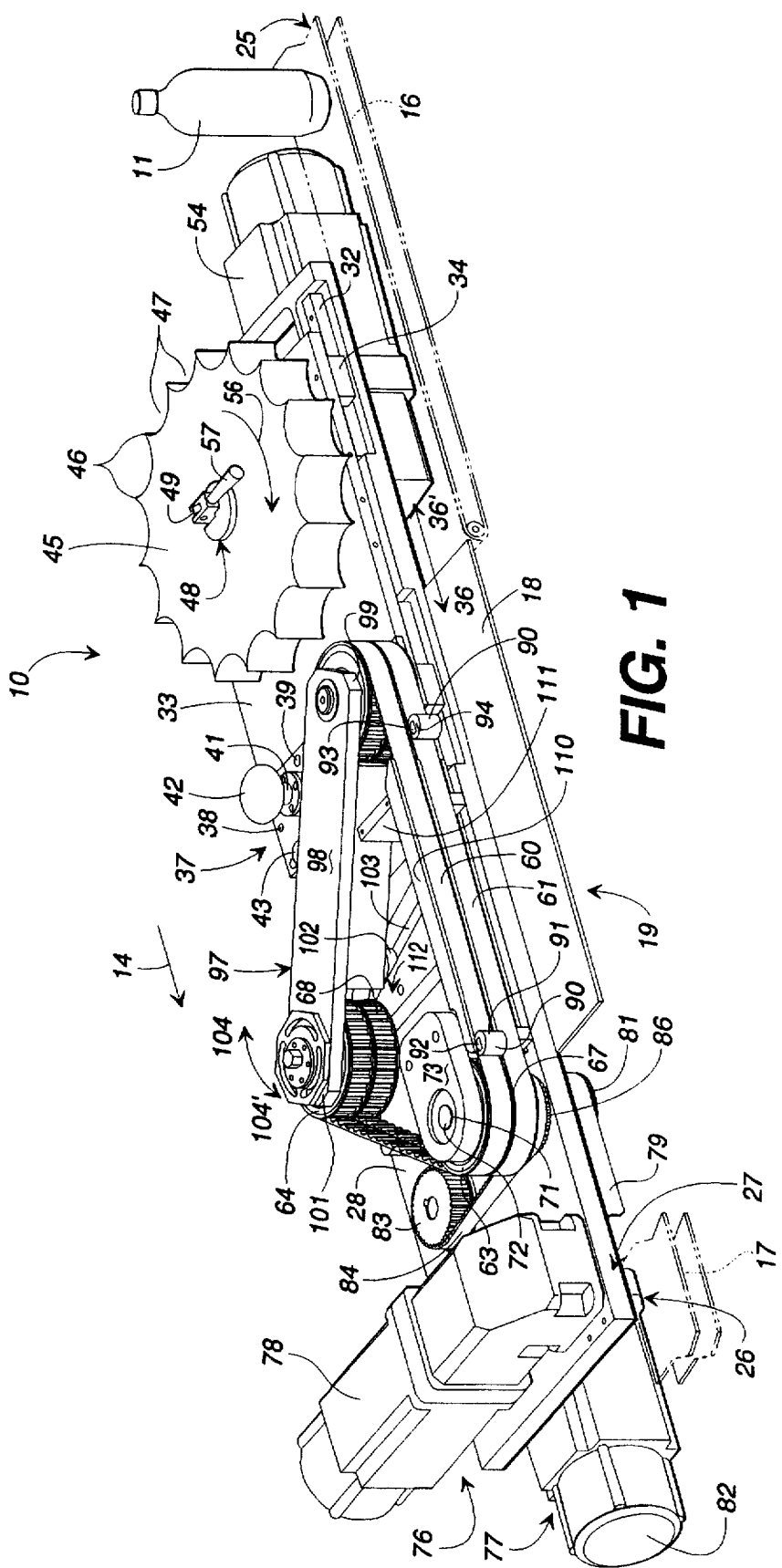
FIG. 1 is a perspective illustration of a selector assembly of the present invention.
Figure 2:
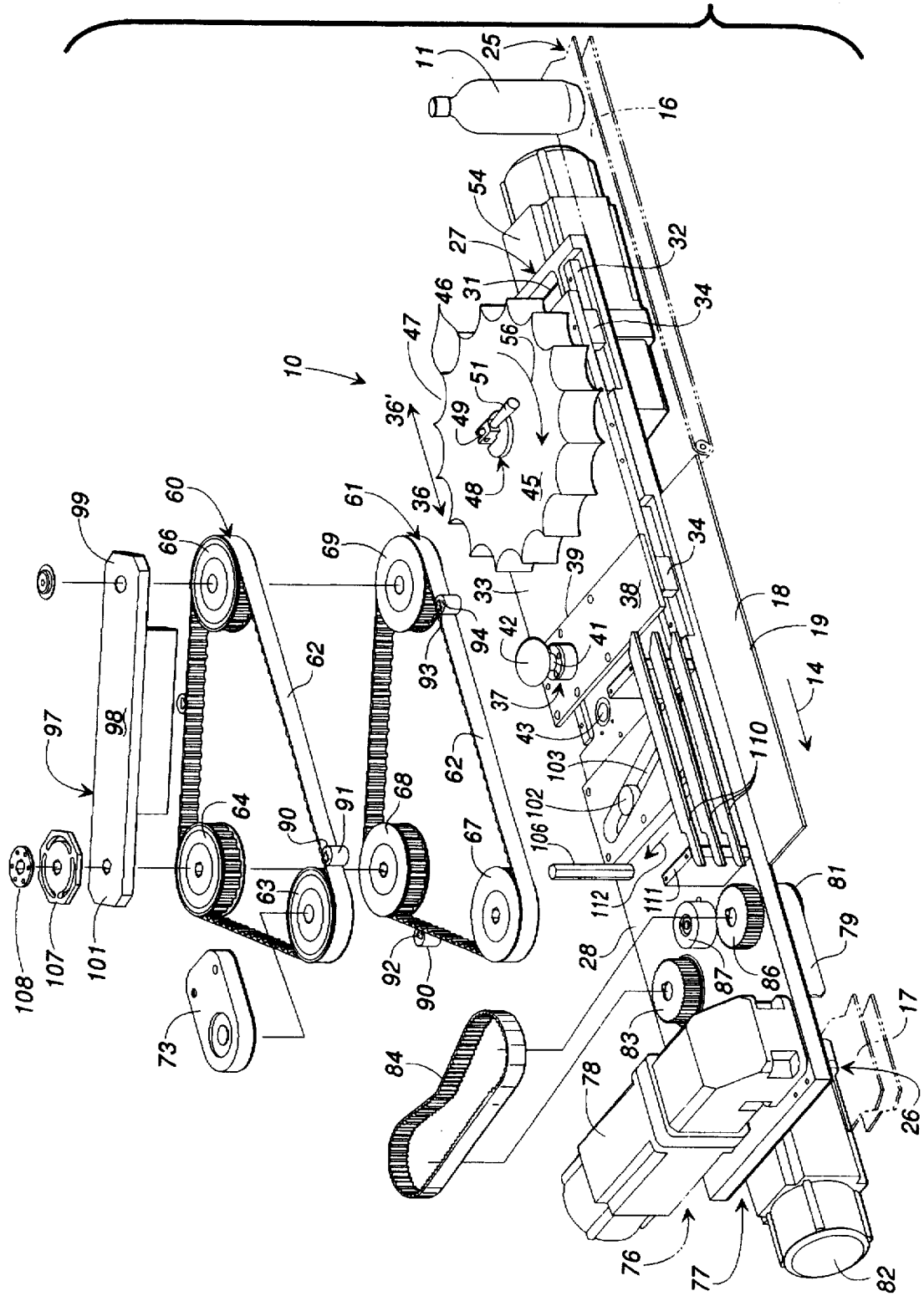
FIG. 2 is an exploded perspective view illustrating the interconnection of the selector belts of the selector assembly.
Figure 3:
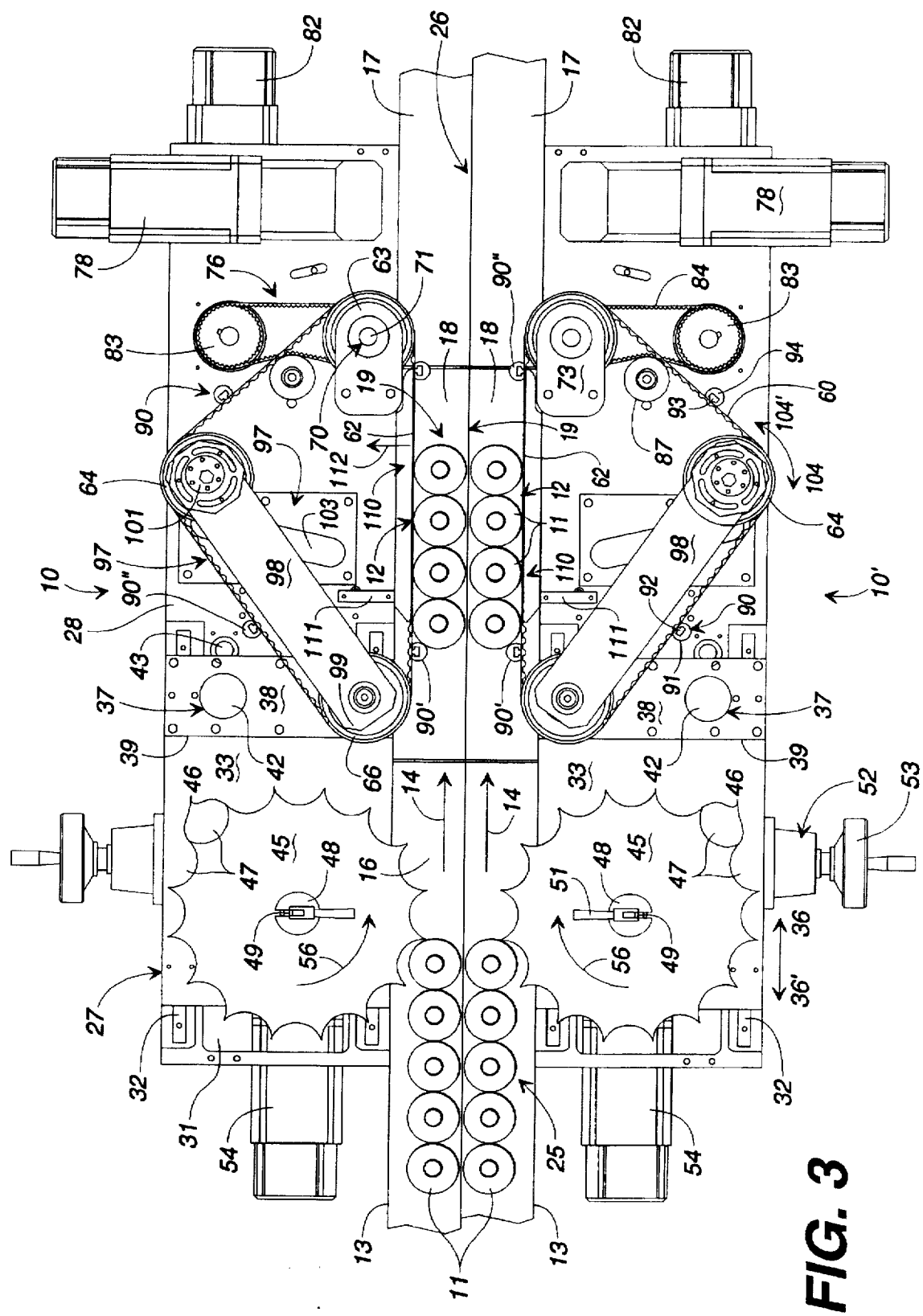
FIG. 3 is a top plan view of a pair of selector assemblies illustrating the movement of lines of products therebetween.

Referring now to the drawings in greater detail, in which like numerals indicate like parts throughout the several views, FIGS. 1, 2 and 3 illustrate the selector assembly 10 of the present invention for dividing continuous lines of products 11 such as bottles or cans of soft drinks or like into separate, groups 12 of products 11 for transferring the products to a packaging machine (not shown) for packaging in appropriate product containers. Generally, the selector assembly will be used for bottles or cans having diameters ranging from approximately 2 inches to 4½ inches, although larger or smaller diameter products also can be accommodated. The selector assembly 10 will be used with one or two lanes 13 of products 11 moving along a processing path 14 toward a "two up" packaging machine for packaging the products in, for example six packs, which are two groups of three products per package. As shown in FIG. 3, for two lanes 13 of products 11, two selector assemblies 10 typically are used, with the selector assemblies being positioned on opposite sides of the processing path 14 of the products 11 along the lanes 13. Only a single selector assembly will be described hereinafter, it being understood by those skilled in the art that any additional selector assembly will have a substantially opposite, mirrored construction.

As shown in FIGS. 1–3, a selector assembly 10 is mounted along the processing path 14 of the products 11, positioned between a product infeed conveyor line 16 and a packaging machine line 17. A dead plate 18 generally is mounted between the infeed and packaging machine conveyor line 16 and 17 at a product grouping area 19 for the selector assembly 10. The dead plate typically is formed from aluminum or steel with a smooth upper surface and extends between approximately 6–18 inches along the length of the product grouping area. The products are received and move along the plate 18 through the product grouping area 19 for forming the products into product groups 12 and the acceleration of the groups up to the speed of the packaging machine line. Typically, the speed of the packaging machine line is significantly greater than the speed of the product infeed line such that the groups 12 of the products 11 must be accelerated between the infeed and packaging machine lines by the selector assembly.

The selector assembly 10 generally includes an upstream or inlet end 25 at which the lines of products are received, and a discharge or downstream end 26 at which the groups of products 12 are discharged onto the packaging machine line 17. The selector assembly has an adjustable framework 27 that includes a longitudinally extending base plate 28 generally formed from material such as aluminum or steel, or which can be formed from other rigid, durable high strength materials such as plastic. As shown in FIGS. 1–3, the base plate includes a cut-out portion 31 (FIGS. 2,3) adjacent the inlet end 25 of the selector assembly. Guiderails 32 are mounted on opposite sides of cut-out portion 31 and extend forwardly substantially parallel to the processing path 14 from the inlet end of the selector assembly to a position intermediate the inlet and discharge ends. The rails support an adjustable secondary plate 33 that is mounted on slide blocks 34 which are slidably mounted on the guiderails 32 so as to enable the movement of the secondary plate in the direction of the arrows 36 and 36'. The secondary plate generally is a substantially rectangularly shaped plate formed from the same material as the base plate 28 and includes a release mechanism 37 attached to a mounting plate 38 at the downstream edge 39 of the secondary plate 33. The release mechanism generally includes a spring loaded locking or pull pin 41 having a gripping handle 42, and which engages a lock opening 43 (FIG. 2) formed in the base plate to lock the secondary plate in a desired position.

As shown in FIGS. 1 and 2, a starwheel 45 is mounted to the adjustable secondary plate 33 so as to be movable in the direction of arrows 36 and 36' with the movement of the secondary plate. The starwheel is generally formed from a plastic material such as an acetic resin include DELRIN or a similar material that is made of a high strength, substantially rigid, durable material. The starwheel is a circular disk having a series of radially projecting teeth 46 that define bottle receiving recesses 47 therebetween for receiving the products 11 therewithin. The recesses of the starwheel generally are sized to receive bottles or cans of a certain range of sizes or diameters as the products are received by the selector assembly 10 from the infeed conveyor line 16, with different sized starwheels being used for different size products.

Figure 4:
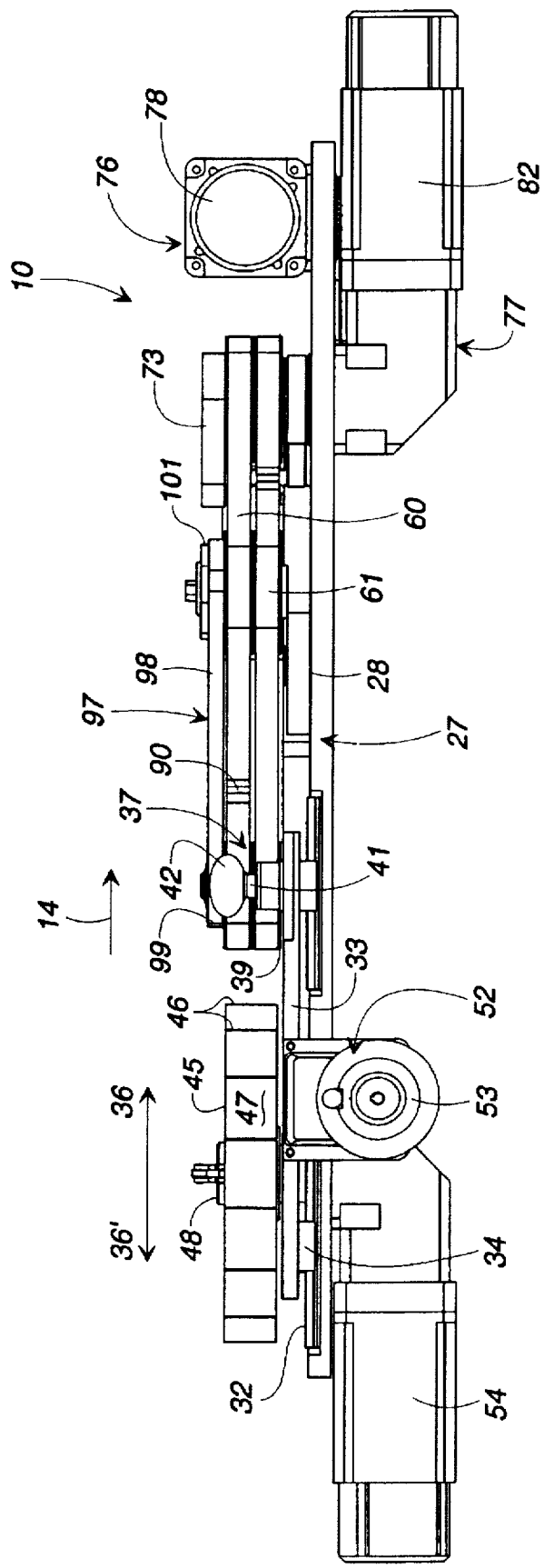
FIG. 4 is a side elevational view of the selector assembly of the present invention.

A latch mechanism 48 extends through and secures the starwheel 45 to the secondary plate 33. Typically, the latch mechanism includes a locking pin 49 inserted approximately through the center of the starwheel and having a pivotable release handle 51 that can be pivoted from a lowered, horizontal position for locking the lock pin in place, to a vertically oriented, unlocked position. As the diameter of the bottles, cans or other products being received and divided by the selector assembly 10 increases to a size greater or less than the recesses 47 of the starwheel, such that the products no longer fit properly within the recesses, the starwheel generally can be changed out quickly and easily for a starwheel having larger or smaller recesses to accommodate the different sized products. In addition, as shown in FIGS. 3 and 4, an adjustment mechanism 52 is mounted to the framework 27 of the selector assembly 10 adjacent the starwheel 45. The adjustment mechanism 52 includes a travel screw or similar adjustment means (not shown) connected to the starwheel, with a hand crank 53 attached thereto. The hand crank is rotated clockwise or counter-clockwise in order to cause the longitudinal movement of the starwheel along the processing path 14 (FIG. 3) of the products 11 in order to adjust the position of the starwheel with respect to the oncoming products in response to the variation in the sizes of the products, instead of requiring the starwheels to be changed out due to slight variations in the diameter of the products.

The starwheel receives the lines of products 11 with the teeth 46 of the starwheel moving between and separating adjacent products of the lines of the products received from the infeed conveyor line 16. A servo-motor 54 is mounted below the secondary plate 33 of the framework 27 of the selector assembly 10 at the inlet end 25 thereof. The servo-motor generally is a conventional type servo-motor that is connected in driving relationship to the starwheel 45. The servo-motor drives the starwheel, causing the rotation of the starwheel in the direction of arrow 56. The starwheel generally is rotated at the speed of the products coming from the product infeed line to control the flow of the products through the product grouping area. The starwheel thus meters the flow of products into the product grouping area 19 and further controls and prevents excessive back pressure in the line of products being moved through the selector assembly.

As shown in FIGS. 1 and 2, a pair of spaced parallel selector belts 60 and 61 are positioned downstream from the starwheel 45 at the product grouping area 19 of the selector assembly 10. The selector belts are vertically displaced from one another with the upper selector belt 60 being stacked directly above and extending substantially parallel to the lower selector belt 61. Each selector belt generally is a conventional type timing belt formed from urethane with a metal core, or a similar flexible, durable material and extends about a substantially triangularly shaped path with a portion 62 of each selector belt extending parallel to the processing path 14 of the products 11 along the product grouping area 19. Additionally, it also is possible to use chains in place of the belts, especially for applications requiring greater tension or for moving heavier products. The selector belts are moved along continuous path in a clockwise direction with each of the selector belts being independently variably driven.

As FIG. 2 illustrates, the upper selector belt 60 extends about a series of gears including a drive gear 63, take-up gear 64 and idler gear 66. Similarly, the lower selector belt 61 extends about a drive gear 67, a take-up gear 68 and an idler gear 69, with the drive, take-up and idler gears 63, 64 and 66 of the upper selector belt 60 being stacked over and in line with the drive, take-up and idler gears 67, 68 and 69 of the lower selector belt 61. A drive shaft 71 is extended through the drive gears 63 and 67 of the upper and lower selector belts. A upper end 72 of the drive shaft 71 is engaged and supported by a bearing block 73 mounted above the drive gear of the upper selector belt, while the lower end 74 (not illustrated) of the drive shaft is engaged by a drive assembly 76 for the upper selector belt 60. The upper end of the drive shaft engages the drive gear 63 of the upper selector belt so that as the drive shaft is rotated by drive assembly 76, the upper selector belt is rotated about its path of movement. A separate drive assembly 77, mounted at the downstream or discharge end 26 of the selector assembly 10 and positioned adjacent the drive assembly 76 connects to the lower selector belt for driving the lower selector belt about its path of movement independently of the rotation of the upper selector belt.

The drive assembly 76 for the upper selector belt 60 generally includes a servo-motor 78 mounted on the upper surface of the base plate 28 of the selector assembly adjacent the discharge end 26 thereof. The servomotor controls the rotation of the upper selector belt at varying speeds, accelerating and decelerating the upper selector belt in relation to the movement of the group of products engaged thereby. A drive belt 79 is connected to the servo-motor and extends about a drive gear 81 rotatably mounted below the under side surface of the base plate. The drive gear receives the lower end of the drive shaft 71 therein such that as the drive gear 81 is rotated by the rotation of the drive belt by the servo-motor 78, the drive shaft in turn is rotated to the drive the upper selector belt.

Similarly, the drive assembly 77 for the lower selector belt 61 includes a servo-motor 82 mounted on the underside surface of the base plate at the discharge end of the selector assembly, and connected to a drive gear 83 mounted on the upper surface of the base plate. As with servo-motor 78, the servo-motor 82 controls the rotation of the selector belt at varying speeds, accelerating and decelerating the lower selector belt in relation to the movement of the group of products engaged thereby. A drive belt 84 is extended about the drive gear 83 and about an idler gear 86 spaced from the drive gear 83 and positioned immediately below and mounted to the drive gear 67 of the lower selector belt 61. The drive gear 83 is rotated by its servo-motor 82 and in turn pulls the drive belt about the idler gear 86 so as to cause the rotation of the drive gear 67 for driving the lower selector belt 61. In addition, a tension roller 87 is mounted between drive gear 83 and idler gear 86 in engagement with the drive belt 84 for maintaining tension on the drive belt to prevent slippage. The rotation of each of the selector belts 60 and 61 thus is independently controlled and varied by the servo-motors 78 and 82 of each of the drive assemblies 76 and 77 for the upper and lower selector belts so the selector belts are rotated independently of one another. Additionally, as FIG. 2 indicates, the drive shaft 71 of the upper selector belt extends through drive gear 67 and idler gear 86 and is freely rotatable therewithin so that the rotation of the drive shaft does not affect and is not affected by the rotation of the idler gear 86 and drive gear 67.

As illustrated in FIGS. 1–3, each of the selector belts further includes a series of selector lugs 90 mounted at spaced intervals about the circumference of the selector belts. The spacing of the lugs 90 depends upon the size and number of products of each product grouping as well on the speed of the products to be loaded. The selector lugs generally are formed form a plastic material such as DELRIN or similar plastic material that is substantially rigid and highly durable. Each of the lugs generally has a rounded configuration with a pointed front edge 91 to enable the lugs to be easily urged between the products, with lugs of differing size and configuration lugs being used for different sized and shaped products. Each lug is attached to its respective selector belt by a T-nut or similar fastener 92, typically formed from urethane, welded or otherwise attached to its selector belt 60 or 61. The head 93 of each T-nut 92 is received within a recess 94 formed in the back side of each selector lug in order to secure the selector lug to the selector belt. As shown in FIG. 3, the selector lugs of the upper and lower selector belts are positioned out of phase with one another they alternate with one another, so that the selector lugs of the upper and lower selector belts engage the products 11 in the product grouping area 19 at different intervals. Typically, the lugs will be on 20 inch centers about the selector belts, with the spacing between the lugs generally being less than or equal to two times the pitch of the machine, and dependant upon on the product size, the size of the belts and the speed of the packaging machine line. The spacing and/or positioning of the selector lugs along the selector belts can be varied by removing the selector lugs from their fasteners and inserting the fasteners at other varying intervals about the selector belt and attaching the selector lugs thereto for different spacings as needed.

In addition, a take-up assembly 97 is positioned within the circumference of the selector belts and in engagement therewith. The take-up assembly includes a take-up arm 98 having a first end 99 that is pivotally mounted to the idler gears 66 and 69 for the selector belts, and a second end 101 is attached to the take-up gears 64 and 68 of the selector belts. A cam follower 102 (FIG. 2) is mounted to the underside surface of the take-up arm and is received within a curved cam track 103 mounted to the upper surface of the base plate 28 of the framework 27. As the cam follower 102 moves along its curved cam track 103, the second end 101 of the take-up arm, and thus the take-up gears 64 and 68 of the selector belts are moved toward and away from the processing path 14 of the products 11 in the direction of arrows 104 and 104'. As the second end of the take-up arm is moved outwardly in the direction of arrow 104, the selector belts are stretched to take-up any slack therein, while the movement of the second end of the take-up arm in the direction of arrows 104' tends to relieve excess tension in the selector belts so as to maintain a substantially constant tension within the selector belt to ensure smooth acceleration control of the selector belts without the selector belts slipping or jerking.

Also, as shown in FIG. 2, a shaft or pin 106 is mounted to the second end 101 of the take-up arm and is received through the take-up gears 64 and 68 about which the gears rotate with the revolution of the selector belts. A pair of eccentrics 107 and 108 (FIG. 2) are received over and secure the upper end of the shaft 106 to enable further adjustment of the take-up gears to ensure tight tension in the selector belts, such adjustment primarily is used when the spacing between the idler and drive gears is at the greatest and least extremes. At such points, the positions of the take-up gears are adjusted with respect to the second end of the take-up arm by engagement of the eccentrics to adjust the tension in the selector belts to the desired level to prevent slippage.

In addition, the idler gears 66 and 69 of the selector belts 60 and 61 are pivotally mounted to the secondary plate as illustrated in FIG. 1. The idler gears thus can be moved longitudinally along the processing path in the direction of arrows 36 and 36' (FIG. 4) with the movement of the secondary plate therealong to adjust the position of the idler gears along the processing path of the products with respect to drive gears of the selector belts for changing the pitch of the assembly and/or using larger circumference selector belts. For such adjustment, lock pin 41 is disengaged from its lock opening and the secondary plate moved into the appropriate position upstream or downstream for the desired spacing of the drive and idler gears whereat the lock pin engages an additional lock opening (not illustrated) to secure the secondary plate in place. The adjustability of the position of the idler gears 66 and 69 together with the operation of the take-up assembly moving the take-up wheels toward and away from the processing path enables the quick and easy adjustment of the selector belts and enable selector belts of varying sizes to be easily interchanged in the selector assembly of the present invention without requiring a change out of the entire selector assembly, and without extensive reconstruction or replacement parts in the selector assembly to accommodate even minor variations in the sizes of the products being grouped and fed into the packaging machine.

As FIGS. 2 and 3 illustrate, a series of backing guides 110 are positioned along the processing path 14 of the products 11 at the selector or product grouping area 19, positioned behind the portion 62 of the selector belts 60 and 61 that extend through the product grouping area. Typically, three backing guides 110 are used, displaced vertically from one another, and each generally being formed from a rigid, durable, plastic material such as DELRIN. The backing guides are mounted to spring blocks 111 which support the backing guides and bias the backing guides laterally toward the processing path of the products. Such spring mounting further enables the backing guides to shift or move laterally away from the processing path in the direction of arrow 112 upon the formation of a jam or misfeeding of the products through the selector assembly. In addition, a detector such as a solenoid or similar sensing means can be provided with the backing guides so as to detect any rearward movement of the backing guide laterally in the direction of arrow 112 which is indicative of the formation of a jam or blockage of the products along their processing path, in order to shut down the infeed and packaging machine lines to allow the operator to clear the jam or locked, misfeed condition without damaging the machinery, and without causing further loss of product. In addition, the backing guides are slidably mounted to spring blocks 111 so as to be able to be telescoped along the processing path so as to enable the backing guides to be used to support additional lengths of the selector belts as they move the groups of products along the processing paths through the product grouping area.

OPERATION

As shown in FIGS. 3 and 5A–5D, substantially continuous lines of products 11 such as bottles, cans, and the like enter the selector assembly 10 and/or 10' (FIG. 3) from a product infeed line 16 in one to two lanes 13 of product for forming a group 12 of products for packaging in six packs, twelve packs, etc. The products are fed to the selector assembly 10, with the products initially being engaged by a large rotating starwheel 45, with the products being received within the recesses 47 formed between the teeth 46 of the starwheel. The starwheel typically is rotated by its servo-motor 54 at approximately the same velocity as the infeed speed of the products 11. The starwheel engages the lines of products 11 and meters the further flow of the lines of products along a dead plate 18 into the product grouping area 19 so as to ensure the correct number of products are metered to the selector lugs 90 of the selector belts 60 and 61 for forming the groups of a desired number of products. In addition, the starwheel regulates the flow of products into the product grouping area so as to keep excessive back pressure resulting from the flow of products off of the selector lugs to enable the selector lugs to pass into and separate the products to form the groups thereof and to prevent jamming of the products within the selector assembly.

As the lines of products are metered into the product grouping area, the lines of products are engaged by the lugs 90 of the selector belts 60 and 61, which engage the lines of products in a timed relationship so that the selector lugs engage the lines of products after a certain desired number of products, for example 3 bottles, have been fed into the product grouping area, as shown in FIGS. 5A–5D, for forming the desired sized groups 12 of products 11. The lugs 90 of the upper and lower selector belts 60 and 61 engage the lines of products in alternating intervals such that the selector lugs of each selector belt engage the lines of products to form every other grouping of products. Thus, for example, a selector lug 90' of the upper selector belt initially would engage the line of products to form a first grouping 12' of products, after which a selector lug 90" would engage the line of products next to form the next grouping 12" of products with the selector belts alternating in their engagement of the lines of products thereafter. It also is possible to use only a single selector belt for dividing and accelerating the products as desired.

As illustrated in FIGS. 5A–5D, upon engagement and separation of each group 12 of products 11 from the line of products by one of selector belts 60 or 61, the speed of that selector belt is progressively increased by the servo-motor 78 or 82 for that particular selector belt. As a result, the selected group of products is accelerated forwardly along the processing path 14 by the selector lug of that selector belt, and is progressively accelerated as indicated in FIGS. 5A–5D as it is moved toward the packaging machine line 17. As a result, each group of products is progressively accelerated in a controlled manner to bring the group of products from the speed of the product infeed line up to the speed of the packaging machine line.

After each selector belt has deposited its selected group of products on the packaging machine line, the velocity of the particular selector belt is slowed down or decelerated by the servomotor for the respective selector belt to the speed of the product infeed line. Thus, as the second selector lugs of each selector belt move into position to engage the line of products, the lug is moving at the speed of the product infeed line so as to ensure smooth engagement of the selector lugs into the line of products. As a result, the velocity of each selector belt is controlled in relation to the movement of the products through the selector assembly to ensure the smooth and orderly transition of the groupings of products from the product infeed line to a packaging machine line without the products being slammed, jammed and/or damaged as a result of being instantaneously accelerated upon being deposited on the packaging machine line.

The selector lug of the present invention thus enables the orderly and smooth selection and transition of groups of products from a product infeed line to a packaging machine line which are being run at different fixed speeds with the danger of instantaneously accelerating the products, and thus causing the products to topple or become jammed or broken being minimized. The speed at which the selector assembly is operated can be varied depending upon the speed of the product infeed and packaging machine lines so as to accommodate variations in product feed rates. Additionally, the selector assembly of the present invention enables the transition of the products from a product infeed line to packaging machine line, in a small, confined area, so as to not require a great deal of floor space while still enabling the smooth and controlled formation and movement of product grouping from the product infeed line to the packaging machine line. Further, the adjustability of the present invention enables its use for dividing and transitioning products between a product infeed line and a packaging machine line having widely varying diameters and shapes without requiring a complete reconstruction or complicated change-out of parts to accommodate such variations in product sizes.

It will be understood by those skilled in the art that while the foregoing invention has been described with reference to a preferred embodiment, various modification, additions and deletions can be made thereto without departing from the spirit and scope of the invention as set forth of the following claims.

We claim:

1. A selector assembly for dividing a continuous line of products moving in the direction of a path of travel along a product infeed line moving at a first rate of speed toward a packaging machine line moving at a second rate of speed, and for forming the products into groups of products of a predetermined group size for packaging, said selector assembly comprising:

means for metering a flow of products from the product infeed line, said means for metering being positioned at an upstream end of the selector assembly and adapted to engage and space the products at desired intervals;

means for grouping the products, said means for grouping being positioned downstream of said means for metering and including a first endless selector belt extending along the path of travel, wherein at least a portion of said first selector belt is mounted adjacent, and moving in the direction of, the path of travel;

said first selector belt including a series of lugs mounted at spaced intervals along the length thereof and being adapted to engage the line of products after the products have passed through and been spaced by said means for metering to form a group of products of a predetermined group size; and means, connected to said first selector belt, for driving said first selector belt at varying speeds in timed relationship with the movement of the products along the product infeed line into the selector assembly and for accelerating the group of products formed between said lugs from the first rate of speed to the second rate of speed for placement of the group of products on the packaging machine line.

2. The selector assembly of claim 1 and wherein said means for metering comprises a starwheel having a series of teeth formed about its circumference and which define a series of product receiving recesses therebetween.

3. The selector assembly of claim 1 and further including a take-up assembly, said first selector belt extending about said take-up assembly, said take-up assembly including a take-up arm pivotally mounted at one end to an idler wheel engaged with said first selector belt and having a take-up wheel mounted at its opposite end and about which said first selector belt at least partially extends, said take-up arm being movable toward and away from the path of travel for introducing slack in, and for removing slack from said first selector belt.

4. The selector assembly of claim 1 and wherein said means for driving said first selector belt comprises a first servo-motor.

5. The selector assembly of claim 4 and further including a second selector belt spaced vertically from and parallel to said first selector belt, said second selector belt having a series of lugs mounted at spaced intervals along the length thereof, and a second servo-motor for driving said second selector belt, said second servo-motor being constructed and arranged for operation independently of said first servo-motor.

6. The selector assembly of claim 1 and further including a plurality of backing guides mounted adjacent the path of travel, said backing guides extending along at least a portion of the length of said first selector belt.

7. The selector assembly of claim 6 and wherein said backing guides are spring biased into engagement with said first selector belt to enable said backing guides to move in response to formation of a jam in the line of products.

8. A method of dividing a substantially continuous line of products moving in the direction of a path of travel at a first rate of speed along a product infeed line into a group of products of a predetermined group size for loading onto a packaging machine line moving at a second rate of speed, said method comprising the steps of:

advancing the line of products along the path of travel into a selector assembly;

metering each of the products of the line of products and spacing the products with respect to one another in response thereto;

engaging the line of products with at least one lug of a first series of spaced lugs affixed to a first selector belt moving in the direction of the path of travel at the first rate of speed and forming a first group of products in response thereto;

progressively accelerating the first group of products with the first selector belt from the first rate of speed to a speed approximately equivalent to the second rate of speed of the packaging machine line; and transferring the first group of products to the packaging machine line.

9. The method of claim 8 and further including the step of moving a take-up assembly about which said first selector belt extends toward and away from the path of travel to draw slack out of and to place slack in said first selector belt to maintain a substantially constant tension on said first selector belt.

10. The method of claim 8 and further including the step of driving the first selector belt about an endless looped path into engagement with the products.

11. The method of claim 10 and wherein the step of driving the first selector belt comprises the steps of accelerating said first selector belt to said second rate of speed, moving said first selector belt at the second rate of speed, and then decelerating said first selector belt to the first rate of speed in response to transferring the group of products onto the packaging machine line.

12. The method of claim 10, further comprising the steps of:

providing a second endless selector belt spaced vertically from and parallel to said first selector belt, said second selector belt moving along the processing path of travel;

providing a second series of spaced lugs affixed to said second selector belt;

alternatingly spacing the lugs of said first series of lugs with the lugs of the second series of lugs along the path of travel;

moving at least one lug of said second series of lugs into engagement with the line of products in the direction of the path of travel independently of the movement of the lugs of said first series of lugs, and forming a second group of products spaced from said first group of products in response thereto;

accelerating said second selector belt to said second rate of speed independently of the acceleration of said first selector belt; and transferring the second group of products to the packaging machine line.

13. The method of claim 12, further comprising the steps of accelerating said second selector belt to the second rate of speed, maintaining the second rate of speed, and then decelerating said second selector belt back to the first rate of speed in response to transferring the second group of products onto the packaging machine line.

14. The method of claim 12, further comprising the step of alternatingly accelerating and decelerating said first and said second selector belts, respectively, with respect to one another while transferring the groups of articles to the packaging machine line.

15. The method of claim 8, further comprising the step of positioning a second selector assembly along the path of travel and opposed to said selector assembly, said second selector assembly being constructed symmetrically with respect to said selector assembly.

16. An apparatus for dividing a continuous line of products moving in the direction of a path of travel along a product infeed line at a first rate of speed toward a packaging machine line moving at a second rate of speed, and for forming the products into groups of products of a predetermined group size for packaging, said apparatus comprising:

a first selector assembly positioned adjacent the path of travel intermediate the product infeed line and the packaging machine line;

said first selector assembly comprising;
- a first endless selector belt supported for movement along the path of travel;
- a second endless selector belt supported for movement along the path of travel independently of said first selector belt, said second selector belt being spaced vertically from, parallel to, and in alignment with said first selector belt;
- a first series of spaced lugs affixed to said first selector belt and extending along the length thereof, the lugs of said first series of lugs being sized and shaped to be moved into engagement with the line of products moving in the direction of the path of travel for forming a first groups of products;
- a second series of spaced lugs affixed to said second selector belt and extending along the length thereof, the lugs of said first and of said second series of lugs, respectively, alternating with one another along the length of said selector belts, wherein the lugs of said second series of lugs are sized and shaped to be moved into engagement with the line of products moving in the direction of the path of travel for forming a second group of products spaced from the first group of products;
- a first drive assembly for moving said first selector belt along the path of travel; and
- a second drive assembly for moving said second selector belt along the path of travel independently of said first selector belt.

17. The apparatus of claim 16, wherein each said drive assembly is constructed and arranged to independently drive its respective selector belt along the path of travel at the product infeed line rate of speed and to accelerate the respective groups of products formed between said lugs to the packaging machine rate of speed for placement on the packaging machine line.

18. The apparatus of claim 16, further comprising a second selector assembly, said second selector assembly being positioned adjacent the path of travel opposite said first selector assembly, said second selector assembly being constructed identical to said first selector assembly, in opposite hand.

19. The apparatus of claim 16, wherein said first drive assembly and said second drive assembly each comprises a servo-motor, respectively.

20. The apparatus of claim 16, further comprising a starwheel positioned upstream of said first selector assembly and being rotated in the direction of the path of travel, said starwheel being constructed and arranged to engage the products as they move thereby along the path of travel for spacing the products at desired intervals.

21. The selector assembly of claim 16, further comprising at least one elongate backing guide positioned adjacent the path of travel and engaged with said first and said second selector belts, respectively, said at least one backing guide being biased toward the path of travel for urging the respective lugs of the selector belts into engagement with the products within the line of products.

22. The selector assembly of claim 16, further comprising a take-up assembly, wherein said first and said second selector belts each extend about said take-up assembly, said take-up assembly including a take-up arm pivotally mounted at one end to a pair of vertically spaced idler wheels, said idler wheels being engaged with one each of said selector belts, and a pair of vertically spaced take-up wheels mounted at the opposite end of the take-up arm engaged with one each of said selector belts, respectively, said take-up arm being movable toward and away from the path of travel for introducing slack in, and for removing slack from said selector belts, respectively.

* * * * *